US008000179B2

(12) United States Patent
Spitzlinger et al.

(10) Patent No.: US 8,000,179 B2
(45) Date of Patent: Aug. 16, 2011

(54) OPTICAL DISC INCLUDING TWO DIFFERENT SETS OF SECTORS HAVING IDENTICAL IDS

(75) Inventors: Markus Spitzlinger, Tumeltsham (AT); Walter Hinterhoelzl, Groedig (AT); Thomas Goebl, Bad Vigaun (AT); Markus Prenn, Salzburg (AT); Klaus Holzapfel, Kuchl (AT); Andreas Winter, Radstadt (AT)

(73) Assignee: SONY DADC Austria AG, Anif (AT)

( * ) Notice: Subject to any disclaimer, the term of this patent is extended or adjusted under 35 U.S.C. 154(b) by 1200 days.

(21) Appl. No.: 11/623,967

(22) Filed: Jan. 17, 2007

(65) Prior Publication Data

US 2007/0183299 A1  Aug. 9, 2007

(30) Foreign Application Priority Data

Feb. 8, 2006  (EP) .................................... 06002575

(51) Int. Cl.
  *G11B 7/24*  (2006.01)
(52) U.S. Cl. ................. 369/30.11; 369/47.12; 369/275.3
(58) Field of Classification Search ............... 369/30.11, 369/47.12, 275.3
  See application file for complete search history.

(56) References Cited

U.S. PATENT DOCUMENTS

| 5,930,209 A | 7/1999 | Spitzenberger et al. |
| 2001/0024411 A1* | 9/2001 | Pirot et al. ................. 369/53.21 |
| 2005/0007911 A1 | 1/2005 | Kotikov et al. |
| 2005/0270945 A1* | 12/2005 | Yoshida et al. ............ 369/53.17 |
| 2006/0126466 A1* | 6/2006 | Imagawa et al. .......... 369/47.36 |

FOREIGN PATENT DOCUMENTS

| EP | 1 528 557 A1 | 5/2005 |
| JP | 11-45509 | 2/1999 |
| JP | 2005-129230 | 5/2005 |
| WO | WO 03/081590 A1 | 10/2003 |
| WO | WO 2004/021347 A1 | 3/2004 |
| WO | WO 2004/070707 A2 | 8/2004 |
| WO | WO 2005/050688 A1 | 6/2005 |

OTHER PUBLICATIONS

Office Action issued Dec. 21, 2010, in Japan Patent Application No. 2007-29595 (with English-language Translation).
English translation of Japanese Office Action mailed Apr. 19, 2011, in Japan Patent Application No. JP2007-029595.

* cited by examiner

*Primary Examiner* — Hoa T Nguyen
*Assistant Examiner* — Andrew J Sasinowski
(74) *Attorney, Agent, or Firm* — Oblon, Spivak, McClelland, Maier & Neustadt, L.L.P.

(57) ABSTRACT

An optical disc including: sectors each having a sector ID; a first area having a first set of sectors sequentially arranged on the disc according to their respective IDs; a second area having a second set of sectors sequentially arranged on the disc according to their respective IDs, the second area being located after the first area in respect of a disc scan direction, the second area including all information needed for playback of the entire disc and having at least one sector ID which duplicates that of a sector in the first set of sectors.

21 Claims, 11 Drawing Sheets

OPTICAL DISC INCLUDING TWO DIFFERENT SETS OF SECTORS HAVING IDENTICAL IDS

TECHNICAL FIELD

The present invention relates to an optical disc as well as to a master disk and a data signal.

TECHNICAL BACKGROUND

Copy protection mechanisms are very effective means for preventing unauthorized copying of data like audio data or video data and other digital data and are therefore often used by content owners in order to reduce their loss of revenue caused by illegal copying of content. Copy protection mechanisms may for example be included within data carriers storing the data to be protected itself or within copying software/copying devices. A lot of different copy protection mechanisms have been developed in the past. Since some of them have already been cracked in the past/are expected to be cracked in the future, there is a need to provide further mechanisms for preventing copying of content or for ensuring that copied content does not meet the expectations of the user.

SUMMARY OF THE INVENTION

It is an objective of the present invention to provide a mechanism for preventing copying or for ensuring that copied content does not meet the expectations of the user.

In order to solve this objective, the present invention provides optical discs according to claims 1 and 20. Further, the present invention provides a master disk according to claim 21. Last, a data signal according to the present invention is provided. Further features and preferred embodiments of the present invention are defined in the subclaims.

The optical disc according to the present invention comprises:
a first area having a first set of sectors sequentially arranged on the disc according to their respective IDs,
a second area having a second set of sectors sequentially arranged on the disc according to their respective IDs, the second area being located after the first area in respect of a disc scan direction and having at least one sector ID which duplicates that of a sector in the first set of sectors,
a start sector located before the first area, and
navigation data indicating to an optical disc reader, after having read the start sector, to displace its pickup reader device to a first target sector having a sector ID of one of the sectors of the second area or of a sector located after the second area, wherein the number of sectors between the start sector and the first target sector is chosen such that the optical disc reader jumps from the start sector to the first target sector using a cross track mode.

In the scope of the present invention, the term "sector ID" means an identifier (identification information) allowing to identify each sector. This identifier usually is a unique identifier. However, according to the present invention, at least two sectors have identical identifiers, i.e. the sectors cannot be distinguished by the optical disc reader by analyzing their respective identifiers only. In the context of a DVD, "sector ID" may for example mean a serial number assigned to a physical sector. In the context of a CD, "sector ID" may for example mean a time (minutes:seconds:frames). In the scope of the present invention, the term "sector" may for example mean the smallest addressable part of a track in the information area of a disc that can be accessed independently of other addressable parts (also called "physical sector"). Within the scope of the present invention, the terms "before" and "after" used in conjunction with areas and sectors always refer to said disc scan direction, i.e. a second area is for example located "after" a first area if the disc scan direction points from the first area to the second area (i. e. the second area will be read after the first area when scanning the optical disc in the disc scan direction). Within the scope of the present invention, the term "good content" means that the content meets the expectations of the user, whereas the term "bad content" means that the content does not meet the expectations of the user. The start sector may be part of a start cell comprising several sectors (for example in case of a DVD Video). In this case, the navigation data indicates to an optical disc reader, after having read the start cell, to displace its pickup reader device to a first target sector having a sector ID of one of the sectors of the second area or of a sector located after the second area.

Generally, each optical disc comprises a spiral-shaped path along which information to be read out by an optical laser pick-up is stored. The information is divided into sectors each having a unique identifier ("sector ID"). The numerical value of the sector ID constantly increases/decreases (in accordance with the specification of the relevant disc) from sector to sector when moving along a disc scan direction.

Generally, a particular sector on an optical disc can be reached using the "on-track mode" or the "cross-track mode" or a combination of said two modes. In the "on-track mode" (usually used by copying software), the reading software (being part of the optical disc reader) instructs the optical pick up device to position itself at a specific start sector on the disc and to read every sector succeeding the start sector (possibly a small amount of sectors may be skipped), i.e. the optical disc reader moves its optical pick-up device along the spiral-shaped path. In contrast, the "cross-track mode" results if the reading software skips the reading of a significant amount of sectors (this mode is usually not used by copying software), which forces the optical disc reader to change the position of the optical pick-up significantly. It would too time consuming to move the optical pick-up along the spiral-shaped path. Thus, the optical disc reader "jumps" in a radial direction (i.e. across the spiral shaped path), which is much faster. If an optical disc reader is driven by a copying software, the on-track mode results from a "read instruction sequence" generated by the copying software (not being part of the optical disc reader) and passed from the copying software to the reading software which processes the read instruction sequence.

In order to perform reading of sectors, the optical disc reader searches for the sectors (by searching for the respective sector ID) and reads the information stored within the sectors. If two sectors having identical sector IDs are stored on the optical disc, the optical disc reader usually reads out only information from the first one of said sectors, i.e. from the sector which is accessed first (internal mechanism of the optical disc reader). The information stored within the second one of said sectors, i.e. the sector which is secondly accessed, is ignored.

The present invention takes advantage of this "behavior" of the optical disc reader: according to the present invention, at least two different sets of sectors having identical IDs are provided. The identical IDs have the effect that only the information stored within the first set of sectors, i.e. the set of sectors which is firstly accessed, is read. Information stored within another set of sectors (e.g. the second set), which is located after the first set of sectors is ignored. Thus, when copying the optical disc according to the present invention, only information stored within first set of sectors (the first area) is copied, whereas information stored within another set of sectors (e.g. the second area) is ignored (this happens if the sectors are read using the on-track mode). This means that not the whole information stored on the original optical disc is copied, but only a part thereof. However, according to the present invention, the information which is of actual interest for the user is not stored within the first area, but stored within another area (e.g. the second area). As a consequence, the user who tries to copy the optical disc according to the present invention will get an incomplete copy (i. e. not a 1:1 copy) of the original optical disc, i. e. not all information which is of interest for the user (or which is absolutely needed by the user) is copied.

This principle may be applied several times to the optical disc, i.e. several pairs of areas may be provided on the optical disc, the one area of each pair comprising at least one sector having an identical sector ID compared to a sector of the other area of said pair. One area of each pair comprises "good" content, the other area of each pair comprises "bad" content. Thus, the copy protection mechanism may be applied several times to the same optical disc.

In order to avoid that a playback device which reads out information stored on the optical disc reads out the "bad" information (information stored within the first area), but instead reads out the "good" content stored within the second area, the optical disc provides navigation data indicating to an optical disc reader, after having read the start sector (located before the first area), to displace its pickup reader device to a first target sector having a sector ID of one of the sectors of the second area or of a sector located after the second area. The navigation data has the effect that the sector access mode of the playback device changes from the on-track mode to the cross-track mode (the read-out laser beam "jumps" in a radial direction towards the first target sector to which the first navigation data "points" to), thereby skipping several sectors, i.e. does not move along the spiral-shaped path. The change from on-track mode to cross-track mode results from an internal mechanism of the optical disc reader of the playback device which decides whether the next sector to be read can be better reached using the on-track mode or the cross-track mode. This decision strongly depends on the number of sectors between the sector last read and the next sector to be read. Therefore, the "distance" (i.e. the number of sectors) between the start sector and the first target sector which is located within the second area or behind it is chosen such that it is assured that the optical reader changes from the on-track mode into the cross-track mode (if the distance between the start sector and the first target sector is not large enough, it may happen that the optical disc reader tries to reach the first target sector not using the cross-track mode, but using the on-track mode). Since jumps implied by navigation data are not taken into account by copying devices, i.e. do not influence the mode of data reading (on-track mode) of copying devices, however playback devices take into account these jumps as described above, the way of reading data from the optical disc according to the present invention is different for copying devices and playback devices.

Thus, an important aspect of the present invention is that the locations of the first area and the second area as well as of the start sector are chosen such that, in a playback device, due to the jump of the pickup device of the optical disc reader, not the first area, but only the second area will be accessed. In other words: the cross-track mode ensures that the optical disc reader (of a playback device) jumps over the first area, whereas the on-track mode forces the optical disc reader (of a copying device) to access the first area. Thus, since the sector access modes are different for disc copying procedures and disc replay procedures, different information is read from the optical disc during copying procedures and replay procedures.

So far, the present invention has only been discussed under the assumption that the first area contains the "bad" content, whereas the second area contains the "good" content. However, there may be the case that a copy program tries to read out the optical disc backwards, thereby accessing the second area first, and thereby reading the right content and ignoring the bad content. In order to avoid this, the present invention may also provide pairs of areas where the first area of said pair (in respect to a scan disc direction) comprises the "good" content, whereas the second area of said pair comprises the "bad" content. A combination of both types of area pairs offers the best "copy protection" of the optical disc.

In an embodiment of the present invention, the first target sector is located after the second area, wherein the navigation data indicates to the optical disc reader, after having read the first target sector or a sector located after the first target sector, to displace its pickup reader device to a second target sector having a sector ID of one of the sectors of the second area. The second target sector corresponds to a second replay position from which data reading should continue. In this embodiment, the second target sector is not accessed by a forward jump from the start sector, but from a backward jump/movement from the first target sector or a sector located behind the first target sector. The number of sectors between the first target sector and the second target sector is chosen such that the optical disc reader jumps from the first target sector to the second target sector using the cross track mode or such that the optical disc reader moves from the first target sector to the second target sector using the on-track mode.

The navigation data is not restricted to a particular "granularity" level: The navigation data may for example instruct the optical pick-up reader device to access a particular content cell which comprises several sectors ("high level navigation data" which may for example be used in the context of DVD-Video), or to directly access a particular sector ("low level navigation data" which may for example be used in the context of DVD-ROM). Navigation data may also instruct the optical pick-up reader device to jump to a particular data file ("high level navigation data"). Another possibility ("medium level navigation data" which may for example be used in the context of DVD-Video) is to respectively assign a start sector and an end sector to two succeeding content cells in a way that, in order to move from the end sector of the first content cell to the start sector of the second content cell, a jump (cross track mode) is needed. For example, sectors "50" to "57" may be assigned to content cell "4", and sectors "6" to "8" may be assigned to content cell "5". Thus, after having read sector "57", the optical pick-up reader device will jump to sector "6" using the cross-track mode. The present invention is not restricted to the above mentioned possibilities.

The invention further provides an optical disc having sectors each having a sector ID, the optical disc further comprising:

a first area having a first set of sectors sequentially arranged on the disc according to their respective IDs, and a second area having a second set of sectors sequentially arranged on the disc according to their respective IDs, the second area being located after the first area in respect of a disc scan direction and having at least one sector ID which duplicates that of a sector in the first set of sectors, a start sector located before the first area, wherein data is arranged on the optical disc such that after having read the start sector, data reading is continued at a first target sector having a sector ID of one of the sectors of the second area or of a sector located after the second area, wherein the number of sectors between the start sector and the first target sector is chosen such that the optical disc reader jumps from the start sector to the first target sector using a cross track mode.

In this case, the optical disc does not comprise navigation data itself. However, the navigation through the data is implied by the arrangement of the data on the disc (for example by arranging the data as data files, wherein two data files to be read successively are located on the optical disc on extremely different positions) which forces the optical pickup device (in case a standard read out program is used to read the data) to change into the cross-track mode.

Further, the present invention provides a master disk for storing a copy protected master image, said master disk being suitable for transferring said copy protected master image onto a plurality of optical discs, the optical disc having sectors each having a sector ID and further comprising:
- a first area having a first set of sectors sequentially arranged on the disc according to their respective IDs,
- a second area having a second set of sectors sequentially arranged on the disc according to their respective IDs, the second area being located after the first area in respect of a disc scan direction and having at least one sector ID which duplicates that of a sector in the first set of sectors,
- a start sector located before the first area, and
- navigation data indicating to an optical disc reader, after having read the start sector, to displace its pickup reader device to a first target sector having a sector ID of one of the sectors of the second area or of a sector located after the second area, wherein the number of sectors between the start sector and the first target sector is chosen such that the optical disc reader jumps from the start sector to the first target sector using a cross track mode.

Last, the present invention provides a data signal representing information suitable for transfer to an optical disc having sectors each having a sector ID, the optical disc further comprising:
- a first area having a first set of sectors sequentially arranged on the disc according to their respective IDs,
- a second area having a second set of sectors sequentially arranged on the disc according to their respective IDs, the second area being located after the first area in respect of a disc scan direction and having at least one sector ID which duplicates that of a sector in the first set of sectors,
- a start sector located before the first area, and
- navigation data indicating to an optical disc reader, after having read the start sector, to displace its pickup reader device to a first target sector having a sector ID of one of the sectors of the second area or of a sector located after the second area, wherein the number of sectors between the start sector and the first target sector is chosen such that the optical disc reader jumps from the start sector to the first target sector using a cross track mode.

The data signal may be used by a manufacturer to generate a master disk according to the present invention or to generate an optical disc according to the present invention using an optical disc recorder.

Thus, according to the present invention, an optical disc is provided, the content of which (and/or the behaviour of which) is changed on the copied optical disc (also referred to as "copy protection mechanism"). For example, when replaying the copied optical disc, undesired advertising data may be replayed, whereas this is not the case when replaying the original optical disc (only desired data is replayed). However, the present invention is not restricted to the above mentioned examples.

BRIEF DESCRIPTION OF THE DRAWINGS

All different aspects of the present invention as set out above and further elucidated below might be combined in any way. The accompanying drawings, which are incorporated in and constitute a part of the specification, illustrate an exemplary embodiment of the invention, and, together with a general description of the invention given above, and the detailed description of the embodiments given below, serve to explain the principles of the invention, wherein.

All drawings are to be understood schematically. In particular, in reality, the number of sectors of each area or between each area may vary significantly from the number of sectors shown in the figures.

Figure 1:
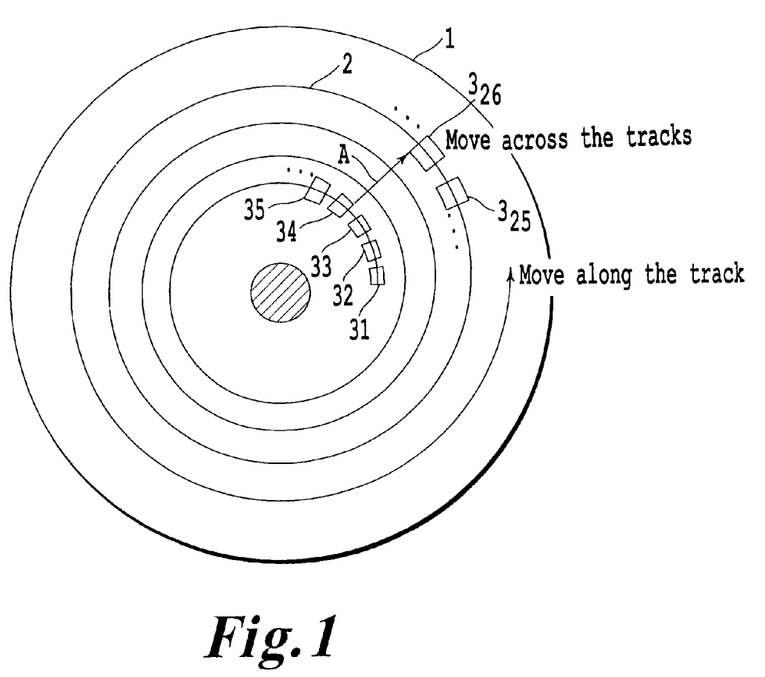
FIG. 1 shows a schematic drawing illustrating different sector access modes used to access sectors on an optical disc.

FIG. 1 shows an optical disc 1 having a spiral-shaped path 2 along which information is stored. The information is divided into several sectors $3_1$ to $3_5$ (the following sectors are not shown in FIG. 1) which are arranged along the spiral-shaped path 2. Starting from sector $3_4$, there are two possibilities to arrive at sector $3_{26}$: A first possibility is to scan along the spiral-shaped path 2 until reaching sector $3_{26}$ ("on-track mode"). A second possibility is to perform a jump in a radial direction indicated by arrow A ("cross-track mode") and then to use the on-track mode for "fine tuning" again. The decision whether a playback device uses the on-track mode or the cross-track mode to move from sector $3_4$ to sector $3_{26}$ (i.e. to skip sectors $3_5$ to $3_{25}$) depends on the number of sectors between sector $3_5$ and sector $3_{26}$. If the number of sectors falls below a certain threshold value, the optical disc reader uses the on-track mode, whereas the cross-track mode is used if the number of sectors lies above said threshold value. The decision whether to use the on-track mode or the cross-track mode is performed by internal hardware/software of the optical disc reader, i.e. cannot be influenced by copying software itself. This effect is used by the present invention as will become apparent below.

Figure 2:
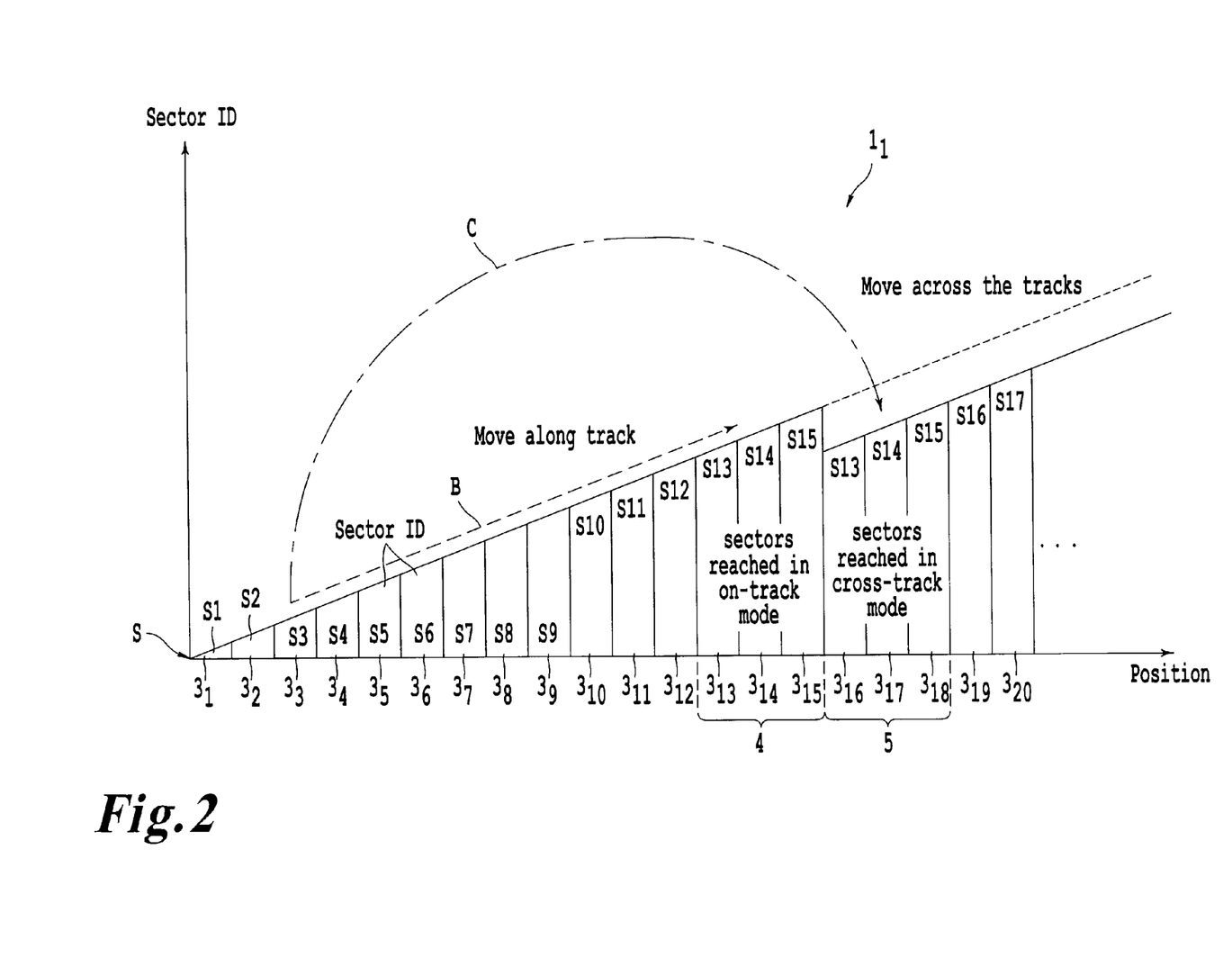
FIG. 2 shows a schematic drawing illustrating a first embodiment of an optical disc according to the present invention.

FIG. 2 shows a first embodiment of an optical disc according to the present invention. The optical disc $1_1$ comprises several sectors $3_1$ to $3_{20}$ each having a sector ID (referenced with S1 to S17) which constantly increases in dependence on the radial position of the respective sector. The optical disc $1_1$ has a first area 4 having a first set of sectors $3_{13}$ to $3_{15}$ sequentially arranged on the disc according to their respective IDs (the higher the ID, the higher the radial position). Further, the optical disc $1_1$ comprises a second area 5 having a second set of sectors $3_{16}$ to $3_{18}$, wherein the second area 5 is located after the first area 4 in respect of a disc scan direction (indicated by the arrow B) and having sector IDs (referenced with S13 to S15) which duplicate those of the first set of sectors $3_{13}$ to $3_{15}$ (this means that the sector ID of sector $3_{13}$ is the same as that of sector $3_{16}$; the sector ID of sector $3_{14}$ is the same as that of sector $3_{17}$; the sector ID of the sector $3_{15}$ ist the same as that of sector $3_{18}$). The optical disc $1_1$ further comprises navigation data "pointing" from the sector $3_3$ (start sector) to the sector $3_{17}$ of the second area 5. The data stored within the first area 4 is data which should not be read when "consuming" the optical disc $1_1$ ("consuming" in this context in particular means to replay the optical disc using a standard optical disc reader), whereas the data stored within the second area 5 is data which should be read when consuming the optical disc $1_1$. In case of a DVD Video, the navigation data may for example be data separately stored within the "ifo" file. Alternatively or additionally, the navigation data may be directly located within the start sector $3_3$.

Copying software will instruct the optical disc reader, starting from sector $3_1$, to read data sector by sector along the disc scan direction B without taking into account the navigation data. This means that, when copying the optical disc $1_1$, the sectors $3_{13}$ to $3_{15}$ will be accessed and data stored therein will be copied. As a consequence, data stored within the sectors $3_{16}$ to $3_{18}$ will not be copied (since these sectors have the same sector IDs as those of the sectors $3_{13}$ to $3_{15}$). This means that all the data included within the second area 5 will not be present on a copy of the optical disc 1; however, an optical disc only having stored the data of the first area 4, and not having stored the data of the second area 5 is useless (or shows degraded quality or contains advertising content, etc.) since the data which should actually be read is stored within the second area 5, and not within the first area 4. The playback device, however, takes into account the navigation data which instructs the optical disc reader to displace ist pickup reader device to the sector $3_{17}$ which means that the optical disc reader will change from the on-track mode used when copying the optical disc $1_1$ to the cross-track mode, thereby performing a jump directly into the second area 5. In this way, the information stored within the first area 4 will not be read. In order to ensure that the optical disc reader will change from the on-track mode (used until having read the start sector $3_3$) to the cross-track mode, the number of sectors between the start sector $3_3$ and the sector $3_{17}$ has to be large enough.

Figure 5:
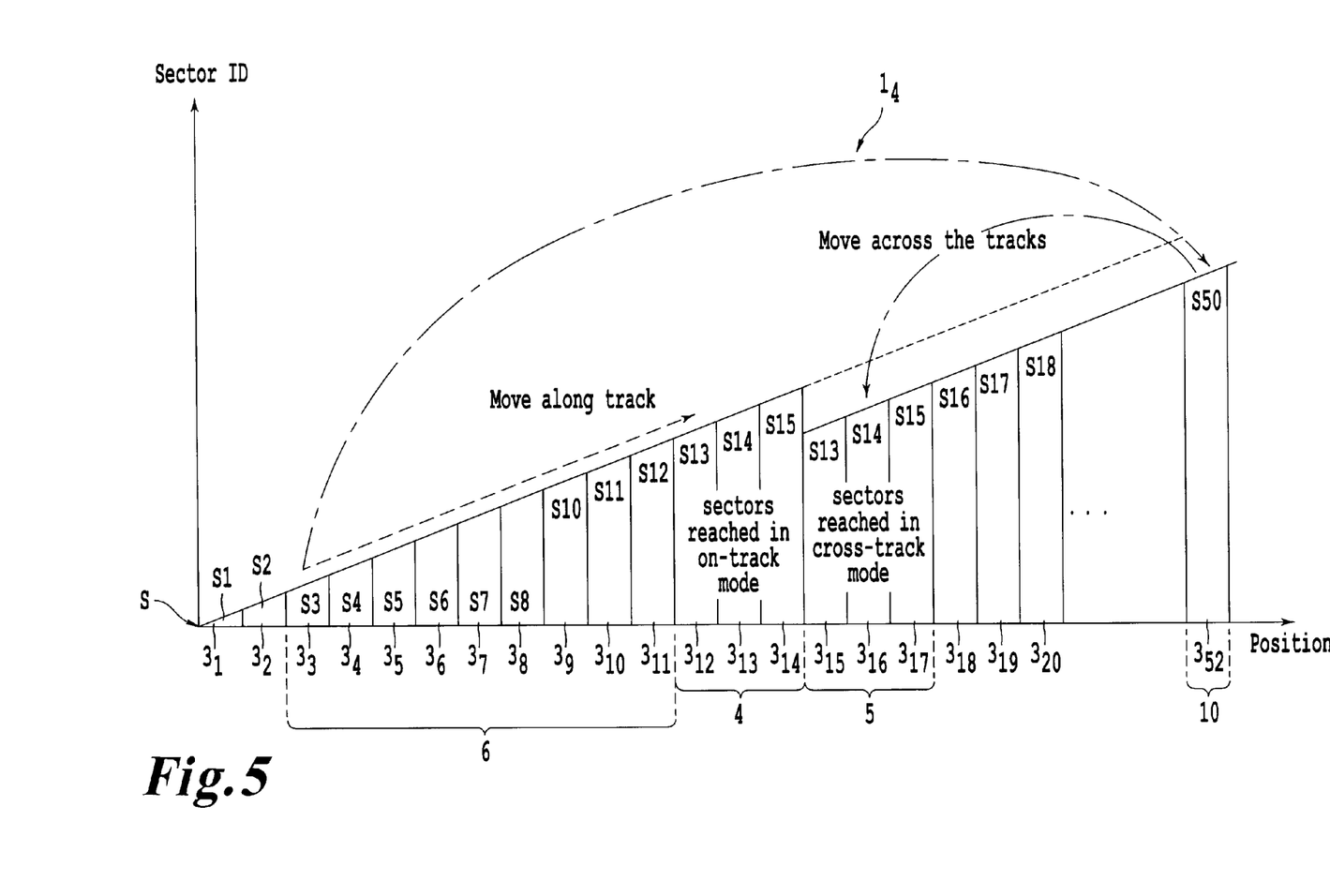
FIG. 5 shows a schematic drawing illustrating a fourth embodiment of an optical disc according to the present invention.

After having reached the sector $3_{17}$ using the cross-track mode, the optical disc reader returns to the on-track mode for reading all succeeding sectors $3_{18}$, $3_{19}$, $3_{20}$, etc. Alternatively, the optical pick-up device may perform a further jump if defined in the navigation data. The cross-track mode is indicated by arrow C in FIG. 2. Alternatively, in order to reach the sector $3_{17}$ from the third sector $3_3$, it may also be possible to jump to a position behind the second area 5 (for example to the end of the optical disc $1_1$) and to perform a further jump back into the second area 5 or to reach the desired sector $3_{17}$ using the on-track mode after the first jump (on-track mode in backward direction). This situation is shown in FIG. 5:

In this embodiment, the navigation data indicates to the optical disc reader to displace its pickup reader device to a first target sector $3_{52}$ located behind the second area 5, wherein the navigation data indicates, after having read the first target sector $3_{52}$ or a sector located behind the second target sector $3_{52}$, to displace its pickup reader device to the sector $3_{16}$ (second target sector) having a sector ID (S14) of one of the sectors of the second area 5, the second target sector $3_{16}$ corresponding to a second replay position from which data reading should continue. The number of sectors between the first target sector $3_{52}$ and the second target sector $3_{16}$ may be chosen such that the optical disc reader jumps from the first target sector $3_{52}$ to the second target sector $3_{16}$ using the cross-track mode. Alternatively, the number of sectors between the first target sector $3_{52}$ and the second target sector $3_{16}$ is chosen such that the optical disc reader moves from the first target sector $3_{52}$ to the second target sector $3_{16}$ using the on-track mode.

Figure 3:
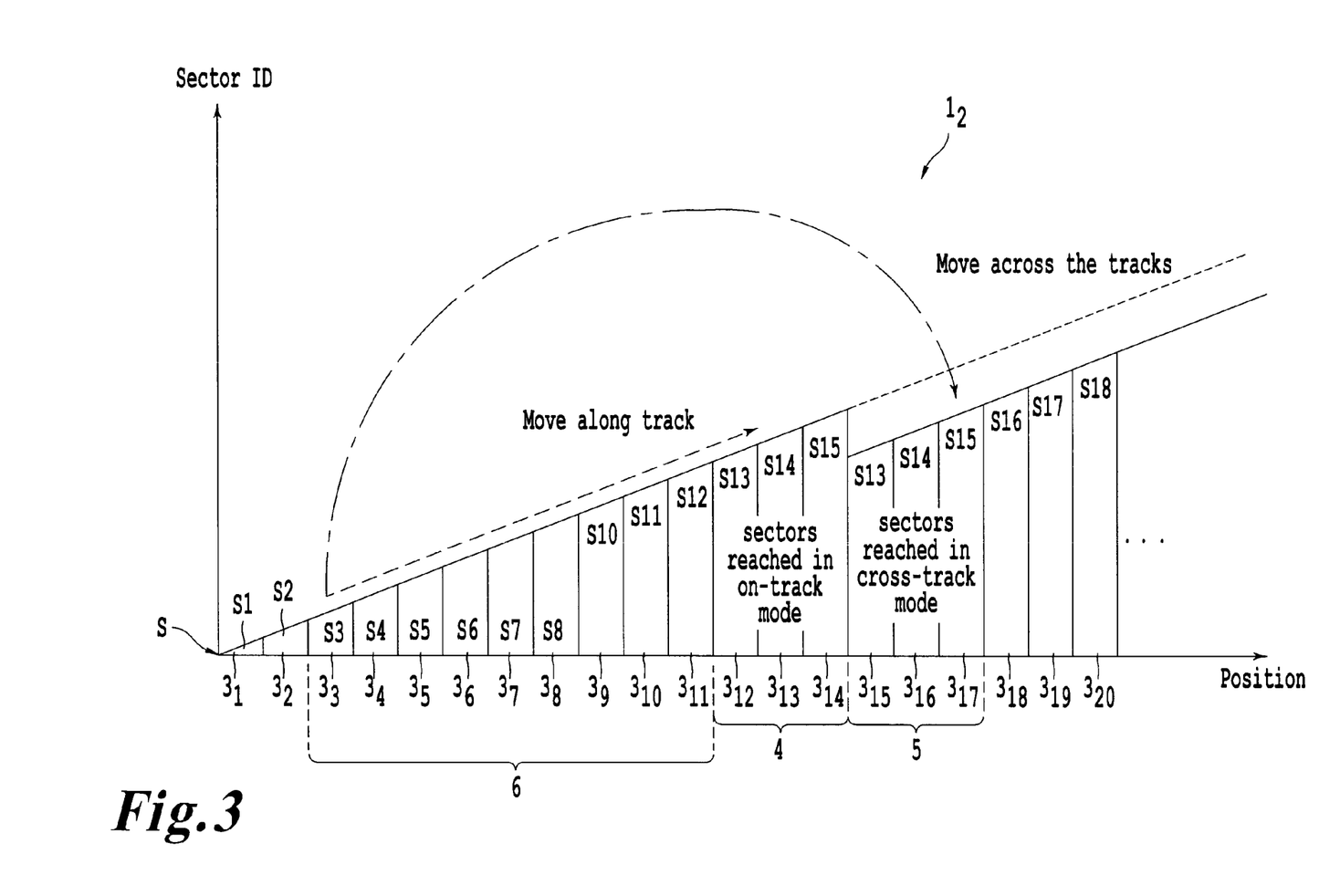
FIG. 3 shows a schematic drawing illustrating a second embodiment of an optical disc according to the present invention.

FIG. 3 shows an optical disc $1_2$ including a third area 6 comprising a third set of sectors $3_3$ to $3_{11}$ sequentially arranged on the disc $1_2$ according to their respective IDs which is located before the first area 4, wherein the number of sectors of the third area 6 is lower than to be expected according to the specification of the optical disc $1_2$ (here, the sector having the sector ID "9" is missing). In other words: the sequence of IDs formed by the third set of sectors $3_3$ to $3_{11}$ does not include at least one ID (here: sector ID "9") to be expected according to the specification of the optical disc.

Figure 7:
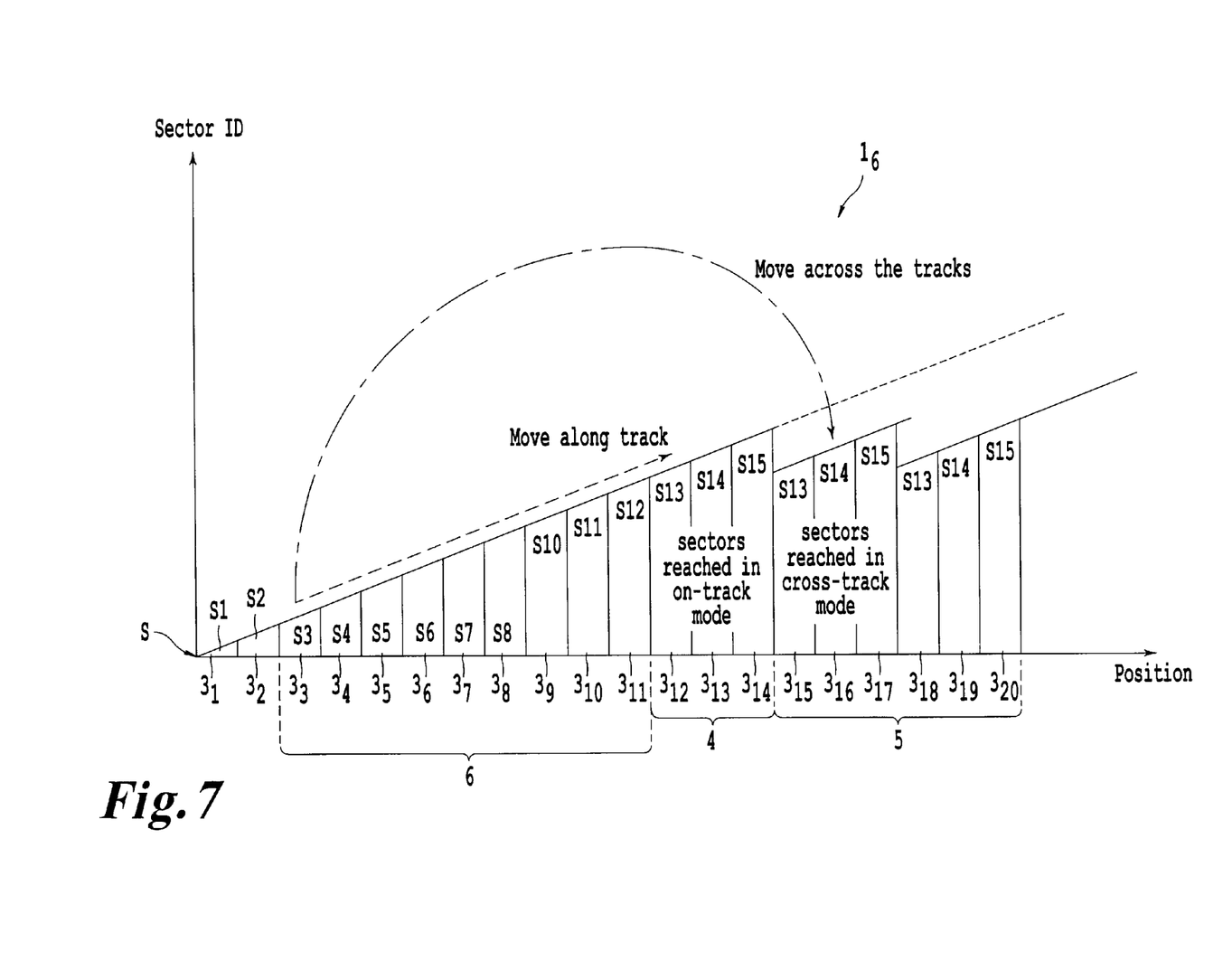
FIG. 7 shows a schematic drawing illustrating a sixth embodiment of an optical disc according to the present invention.

An advantage of the embodiment shown in FIG. 3 is that the risk of jumping into the first area 4 instead of jumping into the second area 5 is reduced. The risk of jumping into the first area 4 usually is not the same for different optical disc readers. This may be due to different optical disc drives (different mechanical pick-up, caching strategy, positioning strategy, . . . ). Generally, each optical disc reader calculates, when instructed to jump to a particular sector (by corresponding navigation data), an estimated distance it has to move its optical pickup device in the radial direction in order to reach the desired sector. After having performed the jump, the optical disc reader reads the sector ID of the sector which has been reached. If it is too low, the on-track mode is used to move in the positive disc scan direction to the desired sector; if it is too high, the on-track mode is used to move in the negative disc scan direction to the desired sector. However, this estimated distance usually is not the same for different optical pickup devices due to manufacturer tolerances. Therefore it may happen that an optical disc reader which calculates a shorter distance than other optical disc readers will jump into the first area 4 while the other optical disc reader will jump into the second area 5. This risk can be reduced or avoided by shifting the first area 4 towards the start S of the spiral shaped path (i.e. to omit one or several sectors 3). The more sectors are missing within the area 6, i.e. the more the first area is shifted towards the start S of the spiral shaped path, the lower the risk of jumping into the first area 4. This effect can also be achieved when the length of the first area 4 (comprising "bad content") is smaller than the length of the second area 5 (comprising "good content"), as shown in FIG. 7: In this embodiment, the second area 5 comprises sectors $3_{15}$ to $3_{17}$ and $3_{18}$ to $3_{20}$ having identical content and identical sector IDs, namely S13 to S15, i.e. the second area 5 comprises two sector sequences having identical content and identical sector IDs (i.e. comprises three sectors more than the first area 4). Alternatively or additionally, one or more sectors of the first area 4 may be omitted (for example sector $3_{12}$; however, the first area 4 must comprise at least one sector having a sector ID identical to a sector ID of the second area 5). This principle can also be applied to other (additional) pairs of areas ("bad content", "good content") in a similar way. In the embodiment shown in FIG. 7, the sectors should be arranged in a way that the optical disc reader jumps into the last three sectors $3_{18}$ to $3_{20}$ of the second area 5 in order to improve the tolerance of the system. This may for example be achieved by omitting further sectors of the third area 6.

Figure 4:
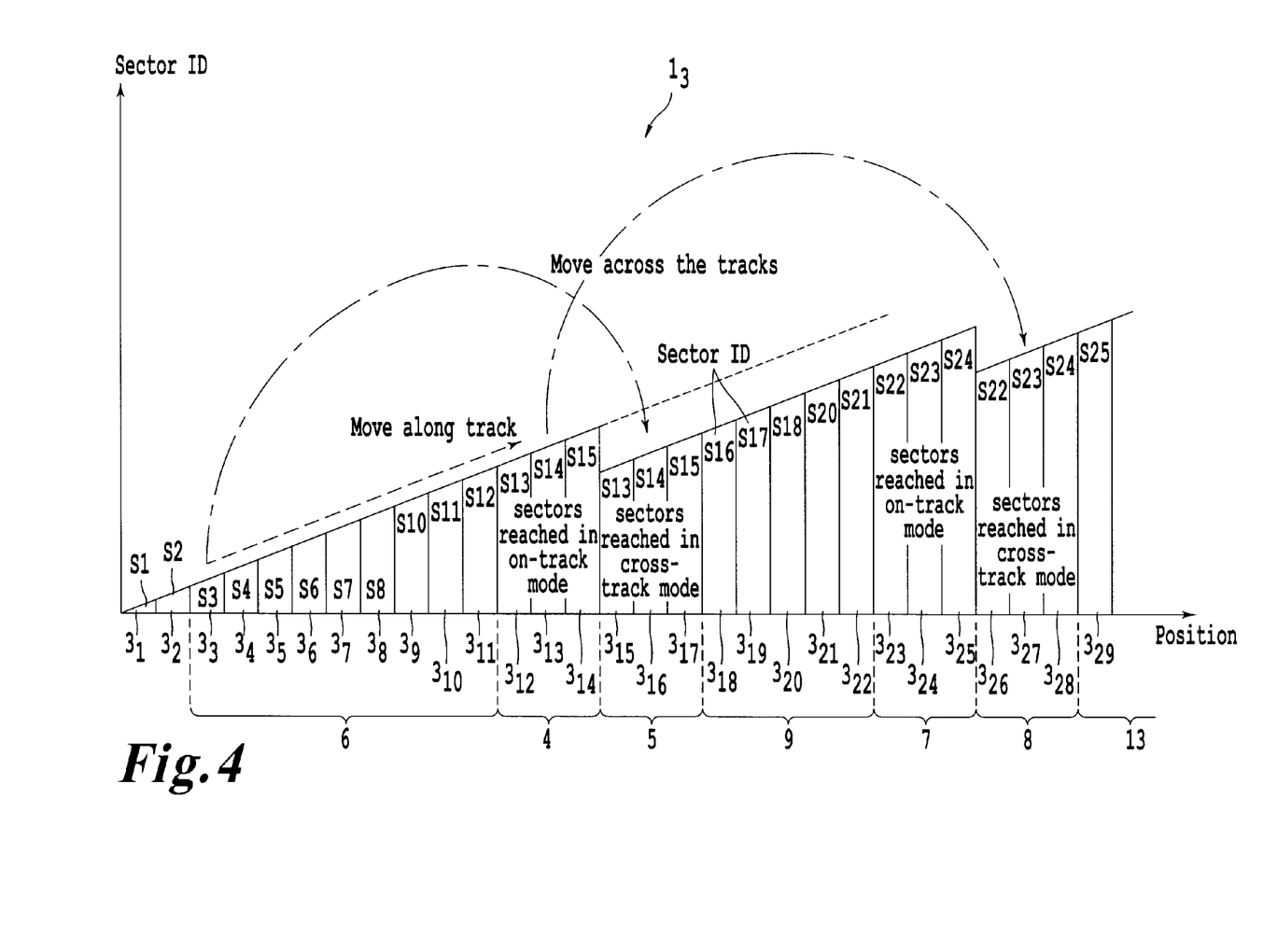
FIG. 4 shows a schematic drawing illustrating a third embodiment of an optical disc according to the present invention.

The optical disc $1_3$ shown in FIG. 4 comprises a fourth area 7 having a fourth set of sectors $3_{23}$ to $3_{25}$ sequentially arranged on the disc $1_3$ according to their respective IDs, the fourth area 7 being located after the second area 5, and a fifth area 8 having a fifth set of sectors $3_{26}$ to $3_{28}$ sequentially arranged on the disc $1_3$ according to their respective IDs, the fifth area 8 being located after the fourth area 7 and having sector IDs 22 to 24 which duplicate those of the fourth set of sectors. The optical disc $1_3$ further comprises navigation data indicating to the optical disc reader to displace its optical pickup reader device, after having read sector $3_{13}$, to sector $3_{27}$ having an ID of one of the sectors of the fifth area 8 (ID S23), wherein the number of sectors between sector $3_{13}$ and sector $3_{27}$ is chosen such that the optical disc reader jumps from sector $3_{13}$ to sector $3_{27}$ using the cross track mode.

Thus, FIG. 4 shows an embodiment where the copy protection principle explained in conjunction with FIGS. 2 and 3 is applied two times. Advantage of this embodiment is that in case the optical disc reader jumps into the first area 4 instead of the second area 5, a second "chance" is given to the optical disc reader to jump into the right area (fifth area 8). Exerimentents showed that the chance is very low that an optical disc reader jumps two times into the wrong area. Advantageously, in this embodiment, the access of the first area 4 will not have a degraded consuming quality as consequence, i.e. the purpose of the first area 4 is to guide the optical disc reader to sector $3_{13}$, and not to degrade the consuming quality. In this embodiment, a fourth navigation area located before the fourth area 7 causing the optical pick-up device to jump over area 7 is needed (not shown in FIG. 4) in order to avoid reading content from the fourth area 7 during playback.

In a similar manner as in the embodiment shown in FIG. 2, a sixth area 9 comprising a sixth set of sectors $3_{18}$ to $3_{22}$ sequentially arranged on the disc according to their respective IDs is located between the second area 5 and the fourth area 7, wherein the number of sectors $3_{18}$ to $3_{22}$ of the sixth area 9 is lower than to be expected according to the specification of the optical disc. In other words: The sequence of IDs (IDs 16 to 21) formed by the sixth set of sectors $3_{18}$ to $3_{22}$ does not include at least one ID to be expected according to the specification of the optical disc (optional). This minimizes the risk of jumping into the fourth area 7 instead of jumping into the fifth area 8.

If the jump initicated by the navigation data was not successful, this may be an indication that not enough sectors 3 within the third area 6 have been omitted, i.e. the shift of the first area 4 towards the start S of the spiral shaped path was not large enough. Thus, according to an embodiment of the present invention, the number of IDs not included within the sequence of IDs formed by the sixth set of sectors $3_{18}$ to $3_{22}$ is smaller than the number of IDs not included within the sequence of IDs formed by the third set of sectors $3_1$ to $3_{11}$. In other words: the shifting rate within the sixth area 9 towards the start S is higher than the shifting rate within the third area 6. In this way, the tolerance of the inventive mechanism is increased.

An improvement of the tolerance of the inventive mechanism may also be achieved if the length of the fourth area 7 is smaller than the length of the fifth area 8, as shown in conjunction with areas 4 and 5 in FIG. 7: the fifth area 8 may for example comprise two sector sequences having identical content and identical sector IDs (i.e. comprise three sectors more than the fourth area 7). Alternatively or additionally, one or more sectors of the fourth area 7 may be omitted (for example sector $3_{23}$; however, the fourth area 7 must comprise at least one sector having a sector ID identical to a sector ID of the fifth area 8). In other words: In the embodiments discussed above, the areas 4, 5, 7 and 8 had the same length (data size). The present invention, however, is also applicable to the case where the areas 4, 5, 7 and 8 are of different lengths. Further, within one of these areas, sector IDs may repeat several times.

Figure 8A:
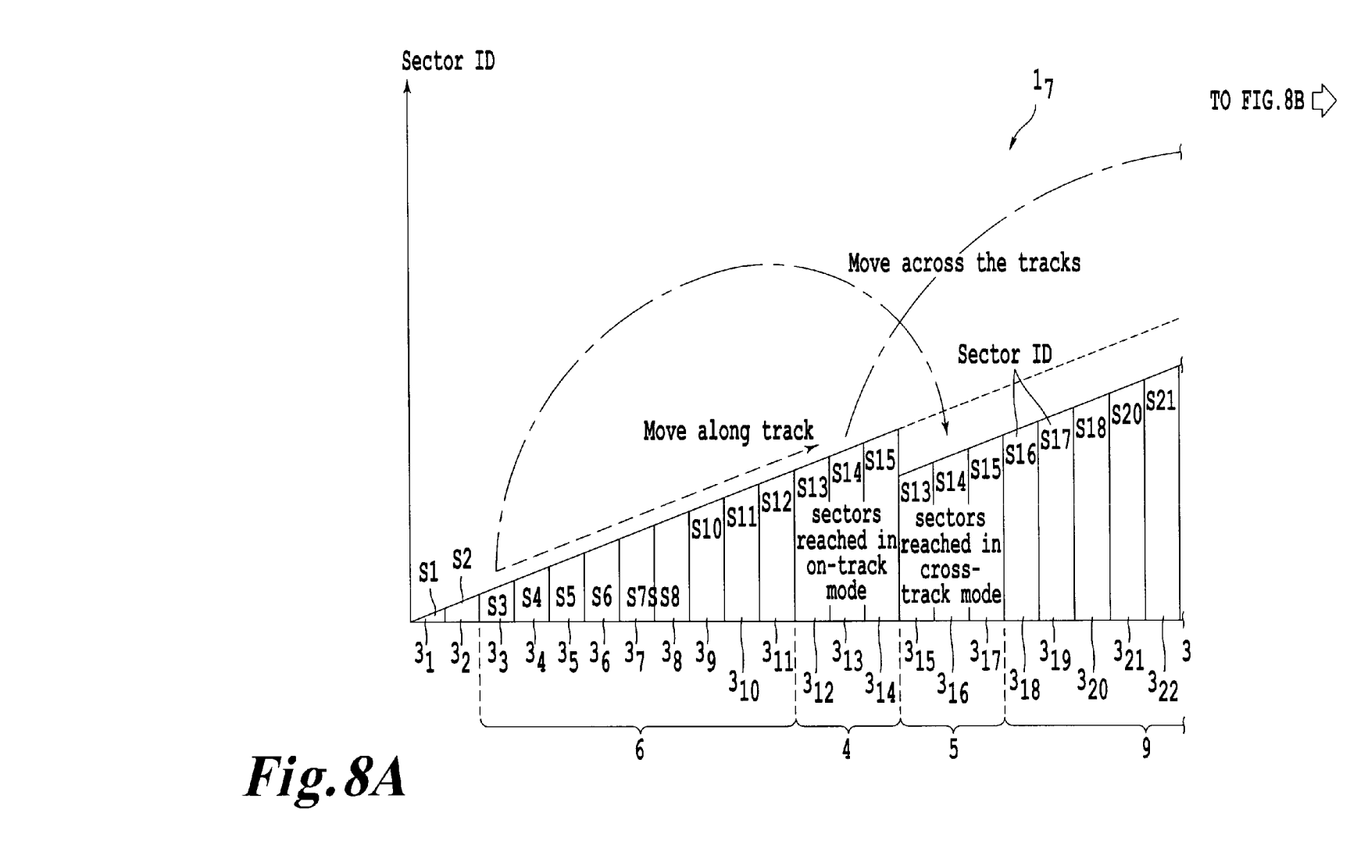
FIG. 8 shows a schematic drawing illustrating a seventh embodiment of an optical disc according to the present invention.
Figure 8B:
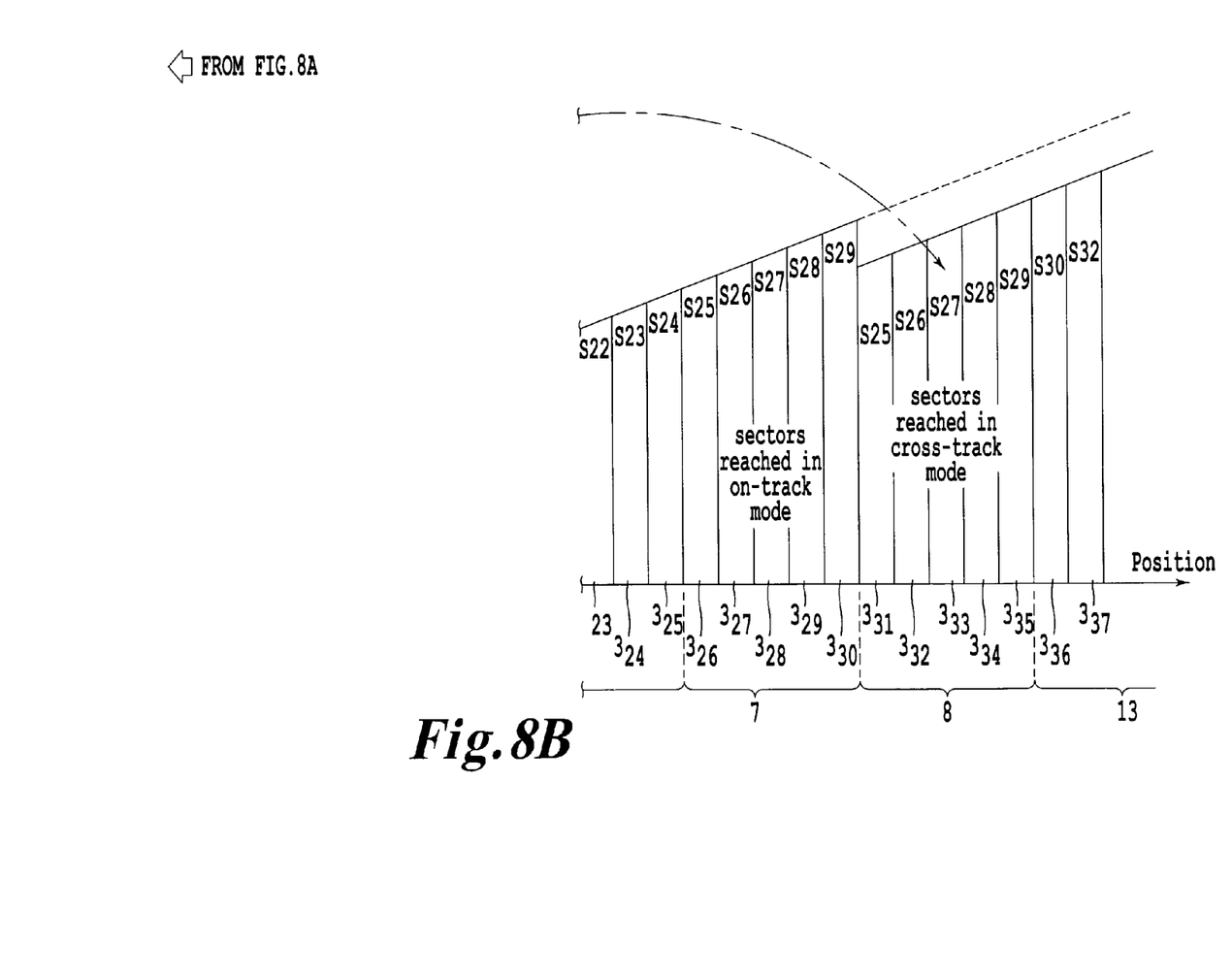

In order to further improve the tolerance of the inventive mechanism, the numbers of sectors of the fourth area 7 and the fifth area 8 may be increased/decreased, as shown in FIG. 8: Compared to the embodiment shown in FIG. 4, each of the fourth area 7 and the fifth area 8 comprises three additional sectors (in this embodiment, also the sixth area 9 comprises three additional sectors). The areas 4 and 7 contain the bad content, whereas the areas 5 and 8 contain the good content. It would also be possible for the area 7 to comprise good content, whereas the area 8 comprises bad content (in order to avoid backward copying). In this case the second jump should be directed into the area 7.

Figure 9:
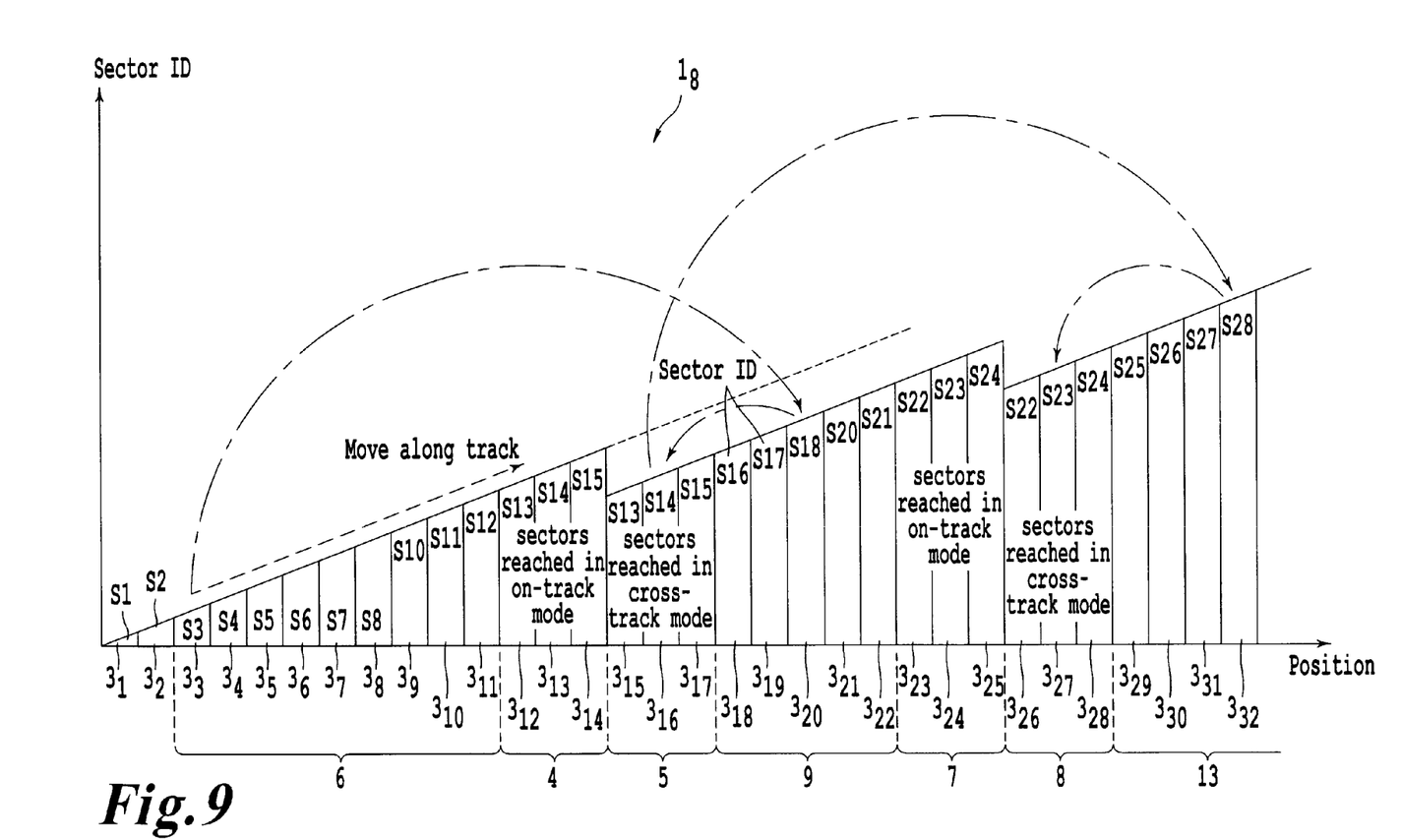
FIG. 9 shows a schematic drawing illustrating a eighth embodiment of an optical disc according to the present invention.

FIG. 9 shows an embodiment where two forward jumps and two backward jumps are applied: the first forward jump leads from sector $3_3$ to sector $3_{20}$. Then, the first backward jump leads from sector $3_{20}$ to sector $3_{16}$. Then, the second forward jump leads from sector $3_{16}$ to sector $3_{32}$. Last, the second backward jump leads from sector $3_{32}$ to sector $3_{27}$. The areas 4 and 7 contain the bad content, whereas the areas 5 and 8 contain the good content.

Figure 6:
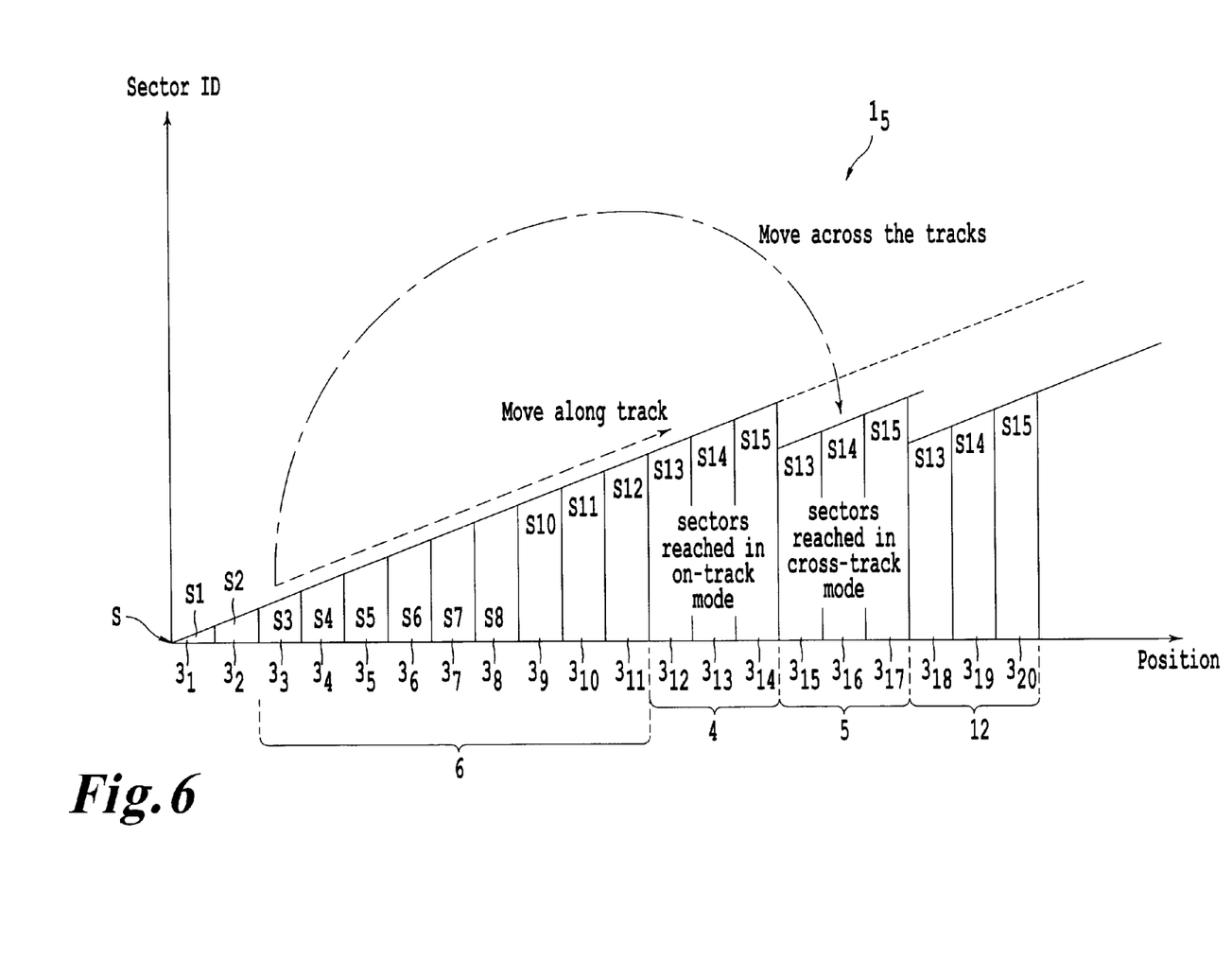
FIG. 6 shows a schematic drawing illustrating a fifth embodiment of an optical disc according to the present invention.

FIG. 6 shows an embodiment in which a seventh area 12 is provided after the second area 5, the seventh area 12 comprising at least one sector having a sector ID which duplicates one of the second set of sectors located in the second area 5. Here, the seventh area 12 comprises sectors $3_{18}$ to $3_{20}$ which have the same sector IDs as that of the second area 5, namely S13 to S15. However, the content of sectors $3_{18}$ to $3_{20}$ is not the same content as that of sectors $3_{15}$ to $3_{17}$. Instead, the content of the sectors $3_{18}$ to $3_{20}$ may for example correspond to the content of the sectors $3_{12}$ to $3_{14}$. Thus, an optical pick-up device moving towards a target sector located within the second area 5 in a direction opposit to the disc scan direction B will run into the seventh area 12. As a consequence, data from the second area 5 will not be read. Instead, only "bad" content (content of the seventh area 12) will be read. Thus, the seventh area 12 has the same purpose as the first area 4 (in case the copying software moves towards the second area 5 in backward direction). Optionally or additionally, an eighth area 13 comprising at least one sector having a sector ID which duplicates one of the fifth set of sectors ($3_{26}$-$3_{28}$) and comprising bad content may be provided after the fifth area 8 for the same reasons as discussed above (see FIG. 4). To be more general: An arbitrary number of pairs of areas ("good content", "bad content") respectively having identical sector IDs may be provided in order to prevent copying in backward direction.

Generally, at least one of the first, fourth, seventh and eighth area 4, 7, 12, 13 may have an effect of degrading the perceptable quality of the optical disc content or the effect of changing the content output by the optical pick-up device when accessing the first, fourth, seventh and eighth area 4, 7,

12, 13. For example, the data stored within the areas 4, 7, 12, 13 may cause an optical disc reader to terminate the reading process of the disc
 refuse to read specific data from the disc (e.g. levels, sounds, videos, maps, detailed information, bonus content, . . . )
 output distorted content
 fill the areas 4, 7, 12, 13 with advertising content
 decrease the consuming quality (e.g. decreased video or audio quality, less or manipulated information, modified user operations, asynchronous video and audio, . . . )
 go into an infinite loop (e.g. reading, playing, . . . )
 jump to another content (e.g. advertising content, low quality content)
 set a timer (do a proposed action at the lapse of time)
 set a status (e.g. register), which enables to possibility to do a proposed action at a later date All items listed in the last paragraph are examples for what may be understood by the term "bad content".

The present invention may be applied to any kind of optical data carrier, for example to a CD-ROM (Compact Disc Read Only Memory), a CD-Extra, a SVCD (Super Video Compact Disc), a SACD (Super Audio Compact Disc), a DVD-ROM (Digital Versatile Disc Read Only Memory), a DVD-Video, a DVD-Audio, a PS2 (Play Station2)-DVD, a UMD (Universal Media Disc), a HD (High Definition)-DVD, a Blu-ray disc or the like.

In order not to unnecessarily degrade the perceptable quality of the optical disc content of the optical disc according to the present invention, the data stored within the first to sixth area 4 to 9 or within a part thereof is data which does not imply any significant reduction of consuming quality for the consumer of the disc due to jumps of the optical pick up device caused by the navigation data. For example, the data stored within the first to sixth area 4 to 9 or within a part thereof may correspond to a still or slow changing video pictures or to audio pauses in which delays due to jumps will not/almost not be perceptible by a consumer, i.e. the data stored within the first to eighth area or within a part thereof is startup/booting/loading data, menu data, corresponds to still or slow changing video picures, in particular black movies, or corresponds to audio pauses.

Experiments have shown that in case of a DVD-video the "copy protection" mechanism according to the present invention yields the best results when being implemented within a VOB (Video Object) file of a DVD-Video disc, i.e. the data stored within the first to sixth area or within a part thereof should be part of the VOB file. It is of course possible to use the mechanisms of the present invention also in other files or digital data on the optical disc (in principle the mechanisms can be used in any data or file stored on the optical disc) such as "ifo" files, "bup" files, or the filesystem (ISO, UDF) of a DVD.

Figure 10:
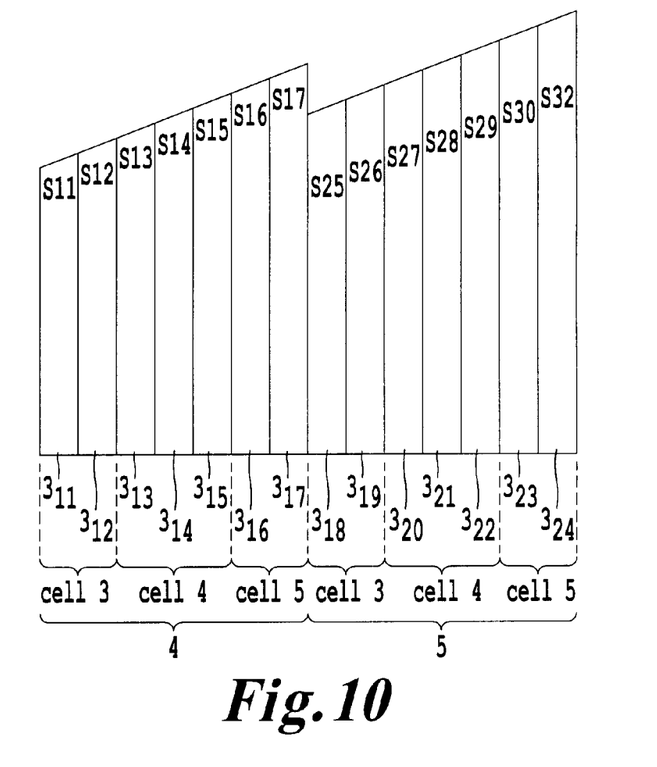
FIG. 10 shows a schematic drawing illustrating a ninth embodiment of an optical disc according to the present invention.

In FIG. 10 it is shown that, in case of a DVD, the sectors of the first area 4 and the second area 5 (as well as of other areas) are grouped together as content cells. Here, the first area 4 comprises three cells, wherein the first cell comprises two sectors, the second cell comprises three sectors, and the third cell comprises two sectors. In a similar way, the second area 5 comprises three cells, wherein the first cell comprises two sectors, the second cell comprises three sectors, and the third cell comprises two sectors. In this case, the navigation data can only direct the optical pickup device to the beginning of a particular content cell, i. e. to the first sector of said particular content cell.

When replaying a DVD-Video, the user usually has to press (activate) buttons (appearing at the screen) from his remote control in order to give commands ("button commands"). For example, the user has to press a button in order to start a movie (other examples are to select the language, to set a register, etc.). Since the inventive mechanism may for example be hidden within a black portion (sequence of black frames) of the movie (which may be several seconds or frames long) before the actual movie starts or be hidden within an extra "black movie" which precedes the main movie, the user would have to press additional buttons, the purpose of which he/she does not understand. In order to avoid this situation, button commands may be activated automatically which makes it possible to check whether an optical disc is a copy or not without bothering the user. That is, according to an embodiment of the present invention, the optical disc is a DVD-Video, wherein buttons are activated automatically, thereby automatically initiating the execution corresponding button commands.

In the following description, further aspects of the present invention will be discussed.

Unauthorized copies of the content of optical media cause a significant loss of revenue for the owners of the content. Copy protection technology reduces these losses. The present invention makes use of the different moving-modes of a pickup head used in the playback of authorized playback devices. The invention enables to ensure a correct playback of the protected optical disc, whereas the unauthorized copy behaves differently e.g., does not work properly. According to the present invention, different information is read from a range of sectors depending on the moving-mode the playback device has used to access the sectors.

The information stored on an optical storage media like CD, DVD, Blu-ray or HD-DVD is encoded in a series of pits and lands. This series of pits are located on a spiral track. This track is segmented into sectors that encode a fixed amount of information.

To read the information of an optical storage media in a reading device, an optical pick-up detects the spiral track. Almost all devices have two distinct modes of operation:

1) On-track mode. i.e. the pick-up moves along the spiral track
2) Cross-track mode, i.e. the pick-up moves inward or outward the spiral track by crossing the tracks.

These modes are used for different purposes. The on-track is used when the information is read. The cross-track mode is used to change the reading position. In principle, it is possible to reach each sector in the on-track mode, too, but using the cross-track mode to reach a distinct sector position is much faster.

The present invention relates to an optical storage media that encodes the information in a way that at least two different information's are read depending on mode that is used to reach this sector (on-track mode or cross-track mode). A useful application of this invention is the prevention of unauthorized copies.

This is due to the fact that copy programs usually read the sectors of an optical media in the on-track mode, whereas unauthorized playback devices follow the navigation control information as defined in the corresponding format specification, e.g. DVD Video Specification. The invention is applicable for the protection of audio data, video data, computer data and other type of digital data stored on an optical media.

The invention can be used to manipulate the information read by the unauthorized copy programs, whereas the authorized playback device read non-manipulated information. The information manipulation can be used to mislead unauthorized copy programs and/or the playback device used to read the unauthorized copy. Thus, unauthorized copy programs are not able to make an identical copy of the copy-protected optical disc by only copying all sectors of the disc sequentially.

Figure 11:
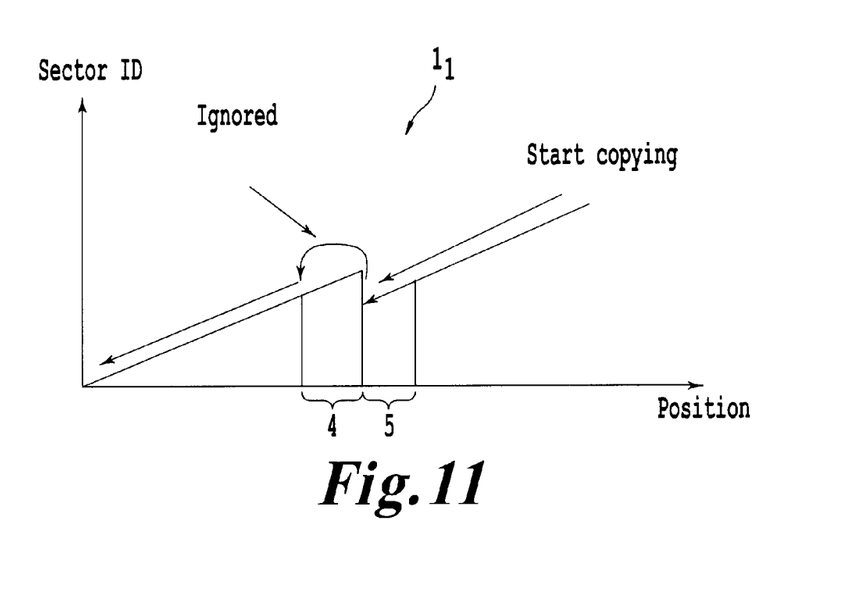
FIG. 11 shows a schematic drawing illustrating a possibility to crack the copy protection mechanism of the first embodiment of the present invention.

So far, the present invention has only been discussed under the assumption that the first area 4 contains the "bad" content, whereas the second area 5 contains the "good" content. However, there may be the case that a copy program tries to read out the optical disc backwards (reverse disc scan direction), thereby accessing the second area 5 first, and thereby reading the good content and ignoring the bad content. This situation is shown in FIG. 11: In order to avoid this, the present invention may also provide pairs of areas where the area of said pair which is accessed firstly in respect to the reverse scan disc direction comprises the "bad" content (here: area 5), whereas the area of said pair which is accessed secondly comprises the "good" content (here: area 4). Such an embodiment is for example disclosed in FIG. 6.

Reference Symbols $1_1$ to $1_8$ Optical disc
2 Spiral-shaped path
3 Sector
A Arrow
B Disc scan direction
4 First area
5 Second area
C Arrow
6 Third area
7 Fourth area
8 Fifth area
9 Sixth area
S1-S52 Sector ID
12 Seventh area
13 Eighth area

The invention claimed is:

1. An optical disc comprising:
    sectors each having a sector ID;
    a first area having a first set of sectors sequentially arranged on the disc according to their respective IDs;
    a second area having a second set of sectors sequentially arranged on the disc according to their respective IDs, the second area being located after the first area in respect of a disc scan direction, the second area including all information needed for playback of the entire disc and having at least one sector ID which duplicates that of a sector in the first set of sectors;
    a start sector located before the first area; and
    navigation data, included in the start sector, which instructs an optical disc reader, after the optical disc reader has read the start sector, to displace a pickup reader device to a first target sector having a sector ID of one of the sectors of the second area or of a sector located after the second area, wherein the number of sectors between the start sector and the first target sector is chosen so that the pickup reader device jumps from the start sector to the first target sector using a cross track mode.

2. The optical disc according to claim 1, wherein the first target sector is located after the second area, and wherein the navigation data instructs the optical disc reader, after having read the first target sector or a sector located after the first target sector, to displace the pickup reader device to a second target sector having a sector ID of one of the sectors of the second area.

3. The optical disc according to claim 2, wherein a number of sectors between the first target sector and the second target sector is chosen such that the optical disc reader jumps from the first target sector to the second target sector using the cross track mode or such that the optical disc reader moves from the first target sector to the second target sector using the on-track mode.

4. The optical disc according to claim 1, further comprising a third area including a third set of sectors sequentially arranged on the disc according to their respective sector IDs located before the first area, wherein the sequence of sector IDs formed by the third set of sectors does not include at least one sector ID of the sequence according to a specification of the optical disc.

5. The optical disc according to claim 1, further comprising:
    a third area having a third set of sectors sequentially arranged on the disc according to their respective sector IDs, the third area being located after the second area, and
    a fourth area having a fourth set of sectors sequentially arranged on the disc according to their respective sector IDs, the fourth area being located after the third area and having at least one sector ID which duplicates that of a sector in the third set of sectors.

6. The optical disc according to claim 5, wherein the navigation data instructs the optical disc reader to displace the pickup reader device, after having read one of the sectors of the first area, to a further target sector having a sector ID of one of the sectors of the fourth area or of a sector located after the fourth area, wherein the number of sectors between said sector of the first area and the further target sector is chosen such that the optical disc reader jumps from said sector of the first area to the further target sector using a cross track mode.

7. The optical disc according to claim 6, further comprising:
    a fifth area including a fifth set of sectors sequentially arranged on the disc according to their respective sector IDs located between the second area and the third area, wherein the sequence of sector IDs formed by the fifth set of sectors does not include at least one sector ID of the sequence according to the specification of the optical disc.

8. The optical disc according to claim 7, wherein a number of sector IDs not included within the sequence of IDs formed by the fifth set of sectors is smaller than a number of sector IDs not included within the sequence of sector IDs formed by another set of sectors.

9. The optical disc according to claim 5, further comprising at least one of a fifth area provided after the second area and a sixth area provided after the fourth area, the fifth area including at least one sector having a sector ID which duplicates that of a sector in the second set of sectors, the sixth area including at least one sector having a sector ID which duplicates one of the third set of sectors.

10. The optical disc according to claim 9, wherein the numbers of sectors of at least one of the first, second, third, fourth, fifth and sixth areas differ from each other.

11. The optical disc according to claim 10, wherein at least one of the first, second, third, fourth, fifth and sixth areas includes sectors having identical sector IDs.

12. The optical disc according to claim 10, wherein at least one of the first, second, third, fourth, fifth and sixth areas includes sector sequences having identical sector IDs.

13. The optical disc according to claim 9, wherein the data stored within the first, third, fifth and sixth areas causes the optical disc reader to terminate the reading process of the disc or to not read specific data from the disc.

14. The optical disc according to claim 9, wherein the data stored within the first to sixth areas or within a part(s) thereof is data which does not imply any significant reduction of a perceptible quality of the optical disc content for a consumer of the disc due to jumps of the optical pick up device caused by the navigation data.

15. The optical disc according to claim 9, wherein the data stored within the first to sixth areas or within a part thereof is startup/booting/loading data, menu data, or data corresponding to still or slow changing video pictures, sequences of black frames, or audio pauses.

16. The optical disc according to claim 9, wherein the data stored within the first to sixth areas or within a part(s) thereof is part of a VOB file of a DVD-Video.

17. The optical disc according to claim 9, wherein the sectors of the optical disc are grouped into content cells, each content cell comprising at least one sector, wherein each of the first to sixth areas includes at least one content cell.

18. The optical disc according to claim 1, wherein the optical disc is a CD-ROM, a CD-Extra, a SVCD, a DVD-ROM, a DVD-Video, a DVD-Audio, a HD-DVD, or a Blu-ray disc.

19. The optical disc according to claim 1, wherein the optical disc is a DVD-Video, and wherein buttons displayable on a screen are activated automatically, thereby executing corresponding button commands.

20. An optical disc comprising: sectors each having a sector ID;
   a first area having a first set of sectors sequentially arranged on the disc according to their respective IDs; and
   a second area having a second set of sectors sequentially arranged on the disc according to their respective IDs, the second area being located after the first area in respect of a disc scan direction, the second area including all information needed for playback of the entire disc and having at least one sector ID which duplicates that of a sector in the first set of sectors; and
   a start sector located before the first area,
   wherein data is arranged on the optical disc such that after an optical disc reader has read the start sector, data reading is continued at a first target sector having a sector ID of one of the sectors of the second area or of a sector located after the second area, a number of sectors between the start sector and the first target sector causes a read-out laser beam of the optical disc reader to jump from the start sector to the first target sector using a cross track mode.

21. A master disc comprising:
a copy protected master image suitable for transfer to an optical disc that includes,
   sectors each having a sector ID,
   a first area having a first set of sectors sequentially arranged on the disc according to their respective IDs,
   a second area having a second set of sectors sequentially arranged on the disc according to their respective IDs, the second area being located after the first area in respect of a disc scan direction, the second area including all information needed for playback of the entire disc and having at least one sector ID which duplicates that of a sector in the first set of sectors,
   a start sector located before the first area, and
navigation data, included in start sector, which instructs an optical disc reader, after the optical disc reader has read the start sector, to displace a pickup reader device to a first target sector having a sector ID of one of the sectors of the second area or of a sector located after the second area, wherein the number of sectors between the start sector and the first target sector is chosen so that the pickup reader device jumps from the start sector to the first target sector using a cross track mode.

* * * * *